(12) United States Patent
Petrich et al.

(10) Patent No.: US 8,540,141 B2
(45) Date of Patent: *Sep. 24, 2013

(54) ENCODING METHOD FOR ENCODING MEDICAL ITEMS

(71) Applicant: Roche Diagnostics Operations, Inc., Indianapolis, IN (US)

(72) Inventors: Wolfgang Petrich, Bad Schoenborn (DE); Stefan Kalveram, Viernheim (DE); Markus Serr, Speyer (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,324

(22) Filed: Oct. 23, 2012

(65) Prior Publication Data

US 2013/0043310 A1 Feb. 21, 2013

Related U.S. Application Data

(63) Continuation of application No. 13/021,372, filed on Feb. 4, 2011, now Pat. No. 8,297,496, which is a continuation of application No. PCT/EP2009/060046, filed on Aug. 3, 2009.

(51) Int. Cl.
*G06F 17/00* (2006.01)

(52) U.S. Cl.
USPC .............. 235/375; 235/462.01; 235/462.1

(58) Field of Classification Search
USPC ............ 235/375, 462.09, 454, 462.01, 487, 235/462.1
See application file for complete search history.

(56) References Cited

U.S. PATENT DOCUMENTS

| | | | |
|---|---|---|---|
| 4,924,078 | A | 5/1990 | Sant'Anselmo et al. |
| 5,077,010 | A | 12/1991 | Ishizaka et al. |
| 5,281,395 | A | 1/1994 | Markart et al. |
| 7,428,688 | B2 | 9/2008 | Reichenbach |
| 2004/0089727 | A1 | 5/2004 | Baharav et al. |
| 2004/0141632 | A1 | 7/2004 | Miyake et al. |
| 2004/0182930 | A1 | 9/2004 | Nojiri |
| 2005/0139674 | A1 | 6/2005 | Ishibashi et al. |
| 2007/0233661 | A1 | 10/2007 | Sayuda |
| 2007/0273928 | A1 | 11/2007 | Robinson et al. |
| 2008/0217391 | A1 | 9/2008 | Roof et al. |
| 2009/0116015 | A1 | 5/2009 | Petrich et al. |
| 2010/0119414 | A1 | 5/2010 | Eisenhardt et al. |

FOREIGN PATENT DOCUMENTS

| | | |
|---|---|---|
| DE | 10123406 | 11/2002 |
| EP | 1843148 | 10/2007 |
| JP | 1102344 A | 4/1989 |
| JP | 2007157127 A | 6/2007 |
| WO | WO 96/30217 | 10/1996 |
| WO | WO 03/086759 | 10/2003 |
| WO | WO 2008/151726 | 12/2008 |

*Primary Examiner* — Edwyn Labaze
(74) *Attorney, Agent, or Firm* — Roche Diagnostics Operations, Inc.

(57) ABSTRACT

A coding for a medical disposable item is proposed comprising at least one information component in encoded form. Associated encoding methods and devices, and associated decoding methods and devices, are also proposed. The coding generally comprises an optical information component comprising one or more fields filled with a gray-scale value up to a certain degree of filling. Each gray-scale value and degree of filling are associated as a value pair determined as part of a code generated to correlate to an information component desired to be applied to and conveyed from a medical disposable item to an associated device that utilizes such items.

25 Claims, 7 Drawing Sheets

ENCODING METHOD FOR ENCODING MEDICAL ITEMS

CLAIM OF PRIORITY

The present application is a continuation of U.S. patent application Ser. No. 13/021,372 filed on Feb. 4, 2011, which is a continuation of PCT/EP2009/060046, filed Aug. 3, 2009, which claims the priority filing benefit of European Application No. 08161756.5, filed Aug. 4, 2008, each of which are hereby incorporated herein by reference in their respective entireties.

TECHNICAL FIELD OF THE INVENTION

The invention relates to an encoding method for generating at least one coding on an item, and to a corresponding decoding method and encoding and decoding devices. Such methods and devices can be used, in particular, in the field of medical disposable items in order to provide such disposable items with a code rapidly and reliably. In particular, but not exclusively, such devices and methods can be used in the field of medical diagnostics, for example for encoding test elements in the form of test tapes or test strips, for detecting at least one analyte in a body fluid. Accordingly, the invention also relates to medical disposable items encoded in this way.

BACKGROUND

In medical diagnostics, in particular, numerous disposable items are known, which have to be encoded rapidly, reliably and cost-effectively. Thus, by way of example, the examination of blood samples or other samples of body fluid, for example interstitial fluid, in clinical diagnostics enables early and reliable identification of pathological states and also targeted and astute monitoring of body states. Medical diagnostics generally presupposes that a sample of blood of interstitial fluid is obtained from the patient to be examined. For this purpose, the skin is usually perforated, for example at the finger pad or the ear lobe, with the aid of a sterile, pointed or sharp lancet in order thus to obtain a small amount of blood for analysis.

Self-monitoring of blood sugar levels is a method of diabetes control that is nowadays applied worldwide. Blood sugar devices in the prior art generally have an analysis instrument which interacts with at least one test element. The sample to be analyzed is applied to a test field of the test element and reacts in the test field with one or more reagents, if appropriate, which are generally chosen in a manner specific to the analyte to be detected. This reaction can be detected, for example optically and/or electrochemically.

In principle, the invention described below can be applied, for example, to all types of test elements in accordance with the prior art. Thus, the test element can comprise, for example, one or more of the following test elements: a test strip, in particular an individual test strip with an individual analysis zone or a plurality of analysis zones; a test tape; a test wheel with a plurality of analysis zones arranged circumferentially; a test wheel with a plurality of analysis zones arranged on its surface, in particular analysis zones arranged in a cake-slice shape; a foldable test element with a plurality of analysis zones (fan folding). In this case, by way of example, it is possible to use test elements in which the sample is applied directly to the analysis zone, for example by direct dropping, dabbing or the like. This direct application can be effected in the form of "top dosing", for example, in which the analysis zone is arranged for example on a planar surface of the test element and the sample is applied to it from above. Alternatively or additionally, however, so-called "edge dosing" could also be considered, in which the sample is applied to an end or side face of the test element. In the case of edge dosing, by way of example, the sample can be applied directly to the analysis zones, or the sample can be transported from the application location to the analysis zone, for example by means of capillary forces. Further embodiments are conceivable. There is also a multiplicity of possibilities regarding the type of detection of the analyte. Thus, by way of example, electrochemical detection can be effected. Alternatively or additionally, optical detection can be effected. In the latter case, by way of example, direct optical detection can be effected by light being radiated in. Alternatively or additionally, the incident light or the light emerging from the analysis zone can also be transported by means of one or more optical waveguides. Various other embodiments are conceivable.

When such medical or diagnostic consumable materials such as test elements and/or lancets, for example, are used, a number of technical problems arise in practice, however, which in many cases have to be overcome by complex apparatus solutions. Thus, one difficulty consists in the fact that different test elements which can be used in an analysis system can have differences among one another. Thus, by way of example, differences can arise with regard to the manufacturer and/or the production method, with regard to the detection reagents used, with regard to the analyte to be detected, with regard to the analysis method and/or analysis system to be used, with regard to the conditions under which the analysis is intended to be carried out, with regard to the parameters and/or the algorithms for the evaluation of measurements, with regard to the batch numbers, with regard to batch-specific special features, with regard to the manufacturing method, with regard to the number of analysis zones on a test element or the like. In the case of lancets or other types of medical disposable items, too, such item-specific information components can arise, in particular information components with regard to the manufacturer, the type of lancet, the lancet systems to be used or the like. In the following application, such information components are generally encompassed by the expression "item-specific information components", wherein such item-specific information components generally relate to information components concerning the medical disposable items, which can differ from item to item or even within an item (for example from analysis zone to analysis zone in the case of test elements having a plurality of analysis zones).

In many cases it is necessary, therefore, to correspondingly encode a medical disposable item or a group of medical disposable items, for example medical disposable items accommodated in a magazine, in order, as soon as this is necessary, to be able to provide these item-specific information components accordingly. One important exemplary application consists in automatic reading-in of item-specific information components by an analysis instrument which is intended to use medical disposable items such as, for example, test strips, test tapes or lancets.

Since manual inputting and read-out of such item-specific information components are generally unreasonable or inconvenient for the patient, various methods and systems in which item-specific information components can be read in automatically are known from the prior art. Thus, by way of example, systems are known in which firstly a calibration test element has to be introduced into the analysis system. Systems are also known in which a separate evaluation code is provided on individual test elements, which code is read by a separate read-out unit. For examples of methods and systems for coding item-specific information components, see US 2007/0273928 A1 and U.S. Pat. No. 5,281,395, the disclosures of which are hereby incorporated herein by reference in their entireties.

In addition to such code systems for individual test strips, different types of codings themselves for encoding test tapes are also known. For example, it is known to provide a coding region on a test tape at the beginning of the test tape, the coding region comprising at least one information component. The coding region can be read for example by the detector which is also used for the optical measurement. Strip bar codes or bar codes in the form of two-dimensional black-white test fields may be used for encoding purposes, for example. Such one- or two-dimensional bar codes are known in various embodiments and in accordance with various standards. The bar codes can be detected, for example, in the form of black-white identification by means of different gray-scale values. Examples of different codings are described in U.S. Pat. No. 5,077,010 and DE 101 23 406 A1, the disclosures of which are hereby incorporated herein by reference in their entireties.

The problem of conventional bar codes is, however, that generally they have to comprise not just a simple serial number, rather many item-specific information components have a more extensive storage depth. Thus, by way of example, extensive information components generally have to be provided for test strips or test tapes in order to enable correct and reliable evaluation of these test elements.

It is therefore known also to use, in addition to simple black-white information components, halftones or gray-scale values themselves as information carrier. Thus, by way of example, an encoding system is known in which data in an image are encrypted by using halftone settings. E.g., see WO 03/086759 A1, the disclosure of which is hereby incorporated herein by reference in its entirety. However, these known methods are comparatively complex and in many cases require an implementation that is costly in respect of resources. Such complexity and outlay often cannot be realized in the field of medical diagnostics, in which, in particular, simple and cost-effective handheld instruments often have to be provided.

It is therefore an object of the present invention to specify a method and a device which are suitable for the encoding and decoding of medical disposable items and which can be realized simply and cost-effectively, in conjunction with a sufficiently large amount of storable or encodable information.

SUMMARY

This object and others that will be appreciated by a person of ordinary skill in the art have been achieved according to the embodiments of the present invention disclosed herein. Embodiments of the present invention include an encoding method and a corresponding decoding method, as well as an encoding device and a corresponding decoding device which at least substantially achieve said object and which are presented in the claims.

With regard to the embodiments described herein, the described aspects generally correspond to one another; that is to say, for example, embodiments of proposed encoding methods correspond to proposed embodiments of decoding methods, and the associated devices described herein generally correspond to the respectively associated methods, such that, with regard to possible configurations of one subject, reference may respectively be made to the description of the associated corresponding subjects. By way of example, for the possible configurations of an embodiment of an encoding device described below, reference may be made to possible configurations of an encoding method described below, and vice versa.

The proposed encoding method serves for generating at least one coding on an item, in particular a medical disposable item, for example a medical disposable item in accordance with the description above. However, other items, too, can naturally be encoded by means of the proposed encoding method.

The coding comprises at least one information component in encoded form. Said at least one information component can comprise, for example, at least one batch information component concerning a particular item. However, other types of information components, too, can be contained in the at least one information component.

The proposed encoding method comprises steps a) to c) described below, which can, but not necessarily, be carried out in the order presented. Furthermore, additional method steps, not mentioned, can also be carried out.

a) The at least one information component is converted into a code, wherein the code comprises a plurality of value pairs composed of a gray-scale value and a degree of filling.

This conversion can be effected by means of a corresponding encoder, for example. This conversion is effected for example in a manner similar to that in which a conventional information component is converted into a binary code or a code according to the decimal system. Thus, by way of example, it is possible to utilize an assignment specification by means of which this conversion takes place. Examples of such conversion or reconversion are described in greater detail below.

b) The code generated in this way is converted into an optical information component, in particular a two-dimensional optical information component. This optical information component has at least one field filled with at least one gray-scale value up to an associated degree of filling in accordance with the plurality of value pairs composed of gray-scale value and degree of filling.

By way of example, if a first value pair of the code provided at one field comprises the fact that a gray-scale value of level 2 is intended to be present up to a degree of filling of 75%, then the at least one field is correspondingly filled with said gray-scale value. A corresponding procedure is adopted with all gray-scale values or all pairs composed of gray-scale value and degree of filling.

A field should accordingly be understood to mean an area filled with a respective uniform gray-scale value. In this case, a field can have, in principle, any desired geometrical form, for example the form of a rectangle, square, polygon, a round form. In this case, a field can also be composed of a plurality of partial fields, which can be configured as contiguous or else non-contiguous. In this case, different fields need not necessarily have an identical size, rather fields having different sizes can be present. A field can, but need not necessarily, optionally additionally be provided with a recognizable boundary, for example at least one border.

c) The optical information component is applied to the item.

By way of example, conventional techniques can be used for this application process, in particular printing techniques, including for example screen printing techniques, offset printing techniques, inkjet printing techniques, laser printing techniques or similar printing techniques. Writing techniques or other techniques such as are usually utilized for applying optical information components to items can also be used. Furthermore, for this application process it is also possible to use techniques in which the item itself is correspondingly modified in order to have the optical information component, for example by the introduction of corresponding depressions into an item which represent the optical information component or the like.

Corresponding to the proposed encoding method, an encoding device for generating the at least one coding on an item is further proposed, which can be used, in particular, using the encoding method in one of the configurations described above or described further below. This encoding device comprises at least one code generating device designed to convert the at least one information component into a code comprising a plurality of value pairs generally composed of a gray-scale value and a degree of filling. Furthermore, the encoding device comprises at least one conversion device, wherein the conversion device is designed to convert the code into an optical information component. Finally, the encoding device comprises at least one application device designed to apply the optical information component to the item.

The code generating device and/or the conversion device can comprise, for example, at least one data processing device. Said data processing device can comprise, for example, at least one personal computer and/or at least one microcomputer and can be designed correspondingly in terms of program technology to perform the code generation and/or the conversion of the code into the optical information component. As described above, the code generating device and/or the conversion device can furthermore comprise at least one encoder which can also be wholly or partly identical to the data processing device in respect of components. In the encoder and/or the data processing device, corresponding specifications for generating the gray-scale value pairs can be saved or stored in some other form.

The encoding method and the encoding device can be developed in various ways in accordance with the embodiments of the present invention.

The form of the coding and/or of the two-dimensional optical information components is of secondary importance, in principle. By way of example, the coding and/or the two-dimensional optical information component can have a rectangular geometrical shape since rectangular image sensors are also used in many cases. In principle, however, other geometrical forms are also possible, for example lines, circles, ovals, triangular or differently shaped polygonal forms or the like. Alternatively or additionally, by way of example, random and/or irregular forms can also be provided. The at least one field of the optical information component can comprise a plurality of partial fields, for example. A dedicated field can be provided for each gray-scale value. Thus, by way of example, each field can be assigned to a specific gray-scale value and be filled with the latter up to the associated degree of filling. Conversely, however, an assignment to the degree of filling can also be effected, such that, by way of example, a specific field is provided for each degree of filling, which is then filled with the associated gray-scale value. In addition to these examples, a multiplicity of other types of fields or optical information components are also possible, for example any desired patterns. If fields are used, then they can, as explained above, for example in turn have, in principle, any desired form, for example a rectangular, linear, round, polygonal or other form. A plurality of fields can be arranged in matrix form, for example, and form the optical information component in this way.

A gray-level coding or gray-scale value coding should in this case generally be understood to mean a coding which also utilizes gray-scale values or gray levels (these terms are generally and hereinafter used synonymously), i.e. different brightness levels of one or more colors, as information carriers. In principle, however, the term gray level or gray-scale value should in this case be interpreted broadly and, for example, also encompasses different brightness levels in the case of detectors for color identification.

Depending on the resolution, in this case gray levels can be effected between black (where in the case of a chromatic color "black" should correspondingly be understood to mean the darkest level) and white (where in the case of a chromatic color "white" should correspondingly be understood to mean the lightest level). In one embodiment, the coding can be effected in discrete steps with at least one intermediate level, possibly a plurality of intermediate levels, between these black and white limit values. By way of example, it is possible to use a gray-level coding in gray-level steps with a constant, predefined spacing from black to white. Thus, in the first method step a) presented above, a discrete number of possible gray-scale values can be predefined, which can, for example, be numbered consecutively, for example gray-scale value level 1, gray-scale value level 2, etc. This facilitates the evaluation since these gray-scale values can be sought in a targeted manner. By way of example, during the evaluation of the optical information component, it is possible to predefine a range within which the gray-scale values are assigned to a specific gray-scale value level. This threshold value method can easily be automated by means of a corresponding gray-scale value identification.

Analogously, a discrete number of possible degrees of filling can also be provided. This also facilitates the evaluation. Thus, by way of example, degrees of filling of 0%, 25%, 50%, 75% and 100% can be predefined as discrete possible degrees of filling. However, a different apportioning is also possible, in principle.

The proposed encoding method can be implemented, in particular, by means of a corresponding computer program. Thus, by way of example, method steps a) and b) presented above can be implemented by means of a computer program with program code when the program is executed on a computer, where the latter can analogously also comprise a computer network. Alongside the computer program, a computer program stored on a machine-readable carrier is correspondingly also proposed.

Alongside the above-described encoding methods and the encoding device, a decoding method and a decoding device are correspondingly proposed. This decoding method serves for decoding at least one encoded information component on an item, in particular on a medical disposable item, in particular by means of an encoding method according to one or more of the embodiments described above. Accordingly, for numerous details of the decoding method, reference may be made to the above description.

The proposed decoding method comprises the following steps:

i) at least one optical information component applied on the item, such as a two-dimensional optical information item is detected, wherein the optical information component comprises at least one field filled with at least one gray-scale value up to an associated degree of filling;

ii) the optical information component is converted into a code by means of a histogram analysis, wherein the code comprises a plurality of pairs composed of a gray-scale value and a degree of filling, in accordance with the histogram analysis; and iii) the code is converted into the information component.

The decoding method described can therefore be a reversal of the encoding method described above. The conversion of the code into the information component or the conversion of the optical information component into the plurality of pairs composed of gray-scale value and degree of filling can, in particular, again be effected by means of an encoder or decoder and/or by means of a correspondingly designed data processing device, for example the data processing device described above. Accordingly, this decoding in accordance with steps ii) and iii) can be configured wholly or partly once again in terms of program technology. Accordingly, a computer program with program code for carrying out method steps ii) and iii) of the decoding method in accordance with the above description when the program is executed on a computer is furthermore proposed. This computer program can also be stored on a machine-readable carrier.

In this case, a "histogram" analysis should be understood to mean any analysis which evaluates a frequency distribution. This evaluation can be effected in graphical form, for example, although this need not necessarily be the case. Generally, therefore, a histogram analysis within the meaning of the present invention should be understood as an analysis which assigns corresponding degrees of filling to gray-scale values, or vice versa, depending on the occurrence in the optical information component evaluated. In this case, the type of analysis is of secondary relevance, in principle, as long as the result represents an assignment of gray-scale values to degrees of filling, or vice versa. Thus, by way of example, a gray-scale value/degree of filling evaluation can be performed directly, or else a spatially resolved image information component can firstly be obtained and is then further converted into gray-scale values and degrees of filling. For an example of the use of histograms to aid analysis of optical data, see EP 1 843 148 A1, the disclosure of which is hereby incorporated herein by reference in its entirety.

Corresponding to the proposed decoding method, a decoding device is furthermore proposed, which can be designed for carrying out the decoding method, for example. The decoding device comprises at least one detection device for detecting the at least one optical information component applied on the item. Furthermore, the decoding device comprises at least one evaluation device designed to convert the optical information component into a code by means of a histogram analysis, wherein the code comprises a plurality of pairs composed of a gray-scale value and a degree of filling, corresponding to the histogram analysis. Furthermore, the decoding device comprises at least one decryption device for converting the code into the information component. For further details and possible configurations, reference may once again be made to the above description of the decoding method and also to the descriptions of the encoding device and of the encoding method.

The decoding device can comprise, in particular, at least one analysis system for detecting at least one analyte in a sample, in particular a body fluid. The analysis system can be designed, in particular, to use at least one test element and/or at least one lancet for this detection.

If a test element is used, then this test element can comprise, in particular, at least one test field which enables, for example, an electrochemical and/or an optical measurement of the analyte, i.e. a quantitative and/or qualitative detection of the analyte. Such test elements are known in numerous embodiments from the prior art.

In one embodiment in which an optical detection method is used, that is to say the test element comprises an optical test field, the analysis system may use, for evaluating the optical information component, that is to say detection device or as part of the latter, the same optical detector which is also used for evaluating the optical test field. In this way, it is possible to save additional components for the detection device. For the decoding and the optical detection of the analyte using the same detector, it is possible to utilize synergistic effects since wholly or in part for example the same hardware components and/or moreover at least in part the same software components can be used.

By way of example, said at least one optical detector can comprise a spatially resolved optical detector. By way of example, a CMOS and/or CCD chip can be employed in this case.

The decoding device can generally also comprise the at least one item, in particular the at least one medical disposable item, on which the optical information component is applied. This has been described above using the example of the analysis system which can comprise, as medical disposable item, for example, a test element in the form of a test strip and/or a test tape, and/or a lancet, which are correspondingly provided with the optical information component. By way of example, the optical information component can comprise, in encoded form, batch information components concerning the medical disposable item.

If an image sensor which can resolve two-dimensional image information components, in particular a CCD chip and/or a CMOS chip, is used for detecting the optical information component, then the evaluation device of the decoding device can be integrated wholly or partly in a corresponding data processing device, as has been described above. Alternatively or additionally, however, the evaluation device can also be integrated wholly or partly in the image sensor itself, for example in the CCD chip and/or the CMOS chip. Consequently, by way of example, a partial evaluation of the optical information component for decoding purposes can already be effected in the image sensor. A corresponding histogram analysis can also be integrated in the image sensor, for example.

Alongside the decoding device, a medical disposable item is furthermore described, comprising at least one coding which has been generated by means of an encoding method according to one or more of the embodiments described above. As explained above, the medical disposable item can comprise, for example, a test element, in particular a test tape and/or a test strip, for detecting at least one analyte in a sample, such as a body fluid. Alternatively or additionally, other disposable items may also be encompassed, for example a lancet for producing a sample of a body fluid or the like.

The coding in the form of the at least one optical information component can in this case comprise, in particular, as explained above, at least one item-specific information component concerning the medical disposable item in accordance with the above description.

The coding or the optical information component can be applied, in principle, on any desired location of the medical disposable item. Thus, the coding or the optical information component can be applied, for example, on the medical disposable item itself. Alternatively or additionally, the coding or the optical information component can also be applied on a packaging of the medical disposable item, such that in this case the packaging conceptually replaces the medical disposable article and is intended to be covered by this term within the scope of the present invention. A packaging can comprise one or a plurality of medical disposable items. If use is made of a test strip and/or a test tape suitable for analyzing at least one body fluid and having at least one corresponding test field, then it is particularly preferred to apply the coding in the form of the optical information component on a carrier on which the at least one test field is also applied. By way of example, said carrier can be a carrier comprising a paper material, a plastics material, a laminate material or a ceramic material.

If a plurality of test fields are arranged on the test element, then a plurality of codings can also be provided for said plurality of test fields and/or a group of the test fields. By way of example, a test tape can be configured in such a way that it comprises alternately test fields and codings in the form of optical information components. In this way, by way of example, information components concerning the number of test fields still remaining, or the like can also be concomitantly encompassed in an encoded manner.

The invention is to be explained in more detail by the following figures and examples.

BRIEF DESCRIPTION OF THE DRAWINGS

The following detailed description of the embodiments of the present invention can be best understood when read in conjunction with the following drawings, where like structure is indicated with like reference numerals and in which.

In order that the present invention may be more readily understood, reference is made to the following detailed descriptions and examples, which are intended to illustrate the present invention, but not limit the scope thereof.

DETAILED DESCRIPTION OF EMBODIMENTS OF THE PRESENT INVENTION

The following descriptions of the embodiments are merely exemplary in nature and are in no way intended to limit the present invention or its application or uses.

Figure 1:
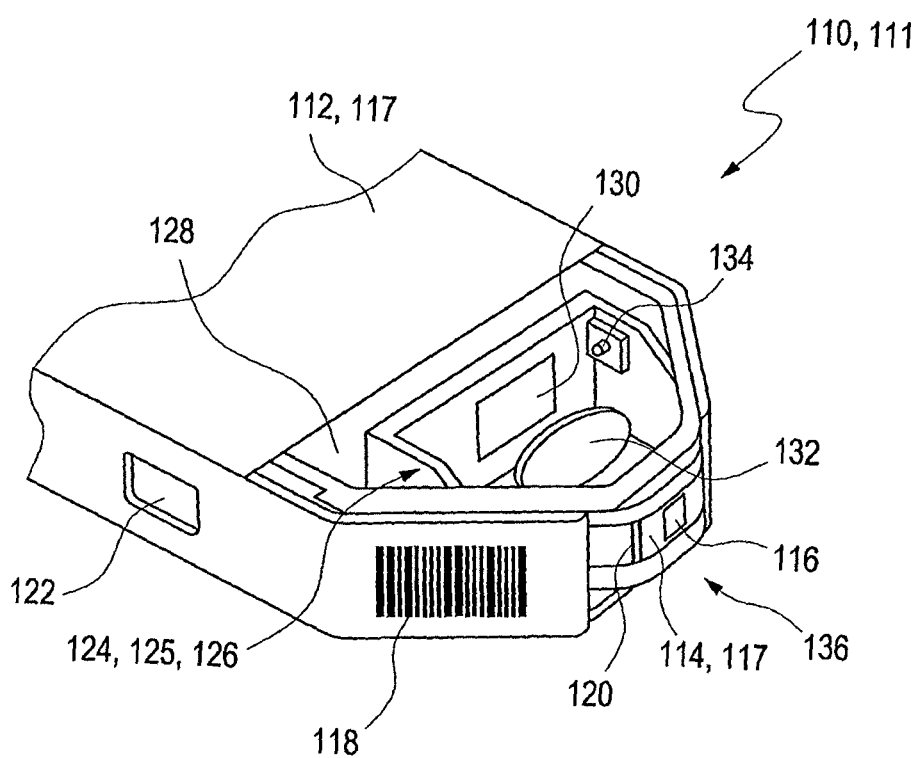
FIG. 1 shows a perspective illustration of an exemplary embodiment of a conventional analysis system as an example of a decoding device.
Figure 2:
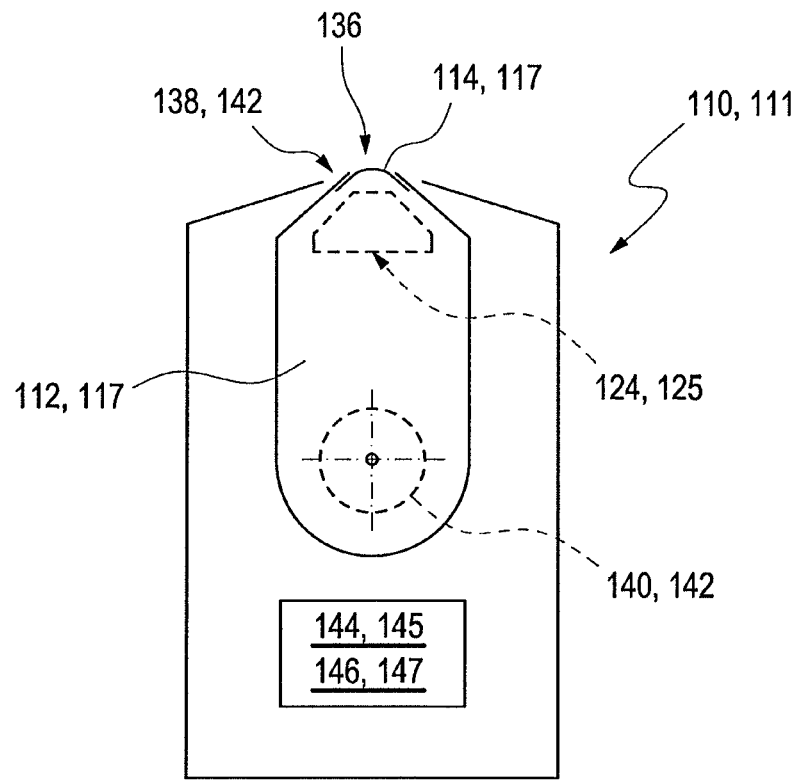
FIG. 2 shows a schematic construction of the analysis system in accordance with FIG. 1.

FIG. 1 shows, in a perspective illustration, an excerpt from a commercially available analysis system 110, which is used as decoding device 111 in the context of the present invention, for example by means of corresponding design in terms of program technology. FIG. 2 shows, in a simplified illustration, a schematic construction diagram of this analysis system 110. Reference is made to both figures.

In the exemplary embodiment illustrated, the analysis system 110 comprises a tape cassette 112, which can be accommodated in an exchangeable manner, for example, in a housing (not illustrated) of the analysis system 110. A test tape 114 is guided in said tape cassette 112, said test tape being exposed only at the tip of the tape cassette 112 in a measurement position 136 and having a plurality of test fields or--this term generally being used synonymously--analysis zones 116, spaced apart in the direction of the tape, for the optical detection of glucose in blood. The tape cassette 112 and the test tape 114 both constitute exemplary embodiments of medical disposable items 117, which are generally designed for a single use or for a use comprising a limited number of usages. Such medical disposable items 117 can be used as mass-produced products for example in medical diagnostics described here or in other fields of medical technology. The present invention essentially relates to the coding of such medical disposable items, which is described below using the example of the test tape 114.

A coding 118 is applied on the outside of the tape cassette 112, said coding having the form of a bar code in the example illustrated. However, at this location, too, a coding according to the invention can be used, in principle. This coding 118 can comprise, for example, item-specific information components concerning the test tape 114 or the analysis zones 116 and the test chemicals in these analysis zones 116.

Furthermore, the test tape 114 can comprise positioning markers 120, which can be printed onto the test tape 114 in the form of bars running transversely with respect to the test tape 114, in a manner alternating with the analysis zones 116, for example. These positioning markers 120 can be detected for example through a positioning window 122 in the tape cassette 112, such that it is possible to correspondingly control a spooling of the test tape 114 through the analysis system 110. Alternatively or additionally, however, as described in greater detail below, it is also possible for codings 118 on the test tape 114 itself also to be used as positioning markers 120.

Furthermore, in the exemplary embodiment illustrated, the analysis system 110 comprises a detector 124 in the form of an optical module 126, which engages into a cutout 128 of the tape cassette 112 when the tape cassette 112 is inserted into the analysis system 110. In the exemplary embodiment illustrated, said detector 124 comprises an image sensor 130 for the spatially resolved recording of image information components, for example a CCD or CMOS image sensor chip. Furthermore, the detector 124 comprises a spatially resolving optical unit 132, for example in the form of one or more lenses. Furthermore, in the exemplary embodiment illustrated, the detector 124 comprises a light source 134, which, if appropriate, can also be provided with a corresponding illumination optical unit and which is designed to illuminate the analysis zone 116 situated precisely in the measurement position 136 in the field of view of the detector 124.

In the known analysis system 110 illustrated in FIG. 1, a separate detector or a separate measurement system can be used in each case for identifying the position of the test tape 114, for identifying the coding 118 and for determining the glucose concentration. The division of these metrological tasks leads to increased equipment costs and increases the structural space of the analysis system 110. Correspondingly, in the case of the simplified illustration of the analysis system 110 in accordance with FIG. 2, an option is implemented in which the three metrological tasks mentioned are performed by one and the same detector 124. It is also possible for just two of the metrological tasks mentioned to be combined, for example. Consequently, additional detectors for identifying coding 118 and an additional positioning sensor (not illustrated in FIG. 1) interacting with the positioning window 122 can be dispensed with by virtue of the detector 124 concomitantly undertaking the positioning task.

The illustration of the analysis system 110 in accordance with FIG. 2 is greatly simplified by comparison with FIG. 1. Thus, by way of example, the test tape 114 is merely indicated in this figure. In the region of the measurement position 136, the tape cassette 112 provides a guide 138 for the test tape 114, within which guide the test tape 114, driven by a drive device 140 (merely indicated in FIG. 2) can be guided and hence positioned relative to the measurement position 136 of the detector 124 (merely indicated in FIG. 2). The guide 138 and the drive device 140 can therefore constitute constituent parts of a transfer device 142 for positioning the test tape 114.

Furthermore, the analysis system 110 can comprise an evaluation unit 144, which can evaluate the measurement of the blood glucose concentration by means of the test tape 114 and the detector 124, in order thus to enable a quantitative and/or qualitative analysis of the blood sample. In the exemplary embodiment illustrated in FIG. 2, the evaluation unit 144 optionally comprises a controller 146 which can control for example the tape positioning by means of the transfer device 142. In other embodiments, a separate configuration or only a partly common spatial configuration in respect of these components 144, 146 is also possible, in principle. In the use of the analysis system 110 as decoding device 111, the evaluation unit 144 may also comprise an evaluation device 145 for evaluating an optical information component and also a decryption device 147 for converting the code, as will be described in greater detail below. However, the evaluation device 145 and the decryption device 147, also can be configured wholly or partly as separate components rather than commonly located as illustrated in FIG. 2. In this case, the units 144, 145, 146 and 147 can comprise one or more electronic components, for example one or more microprocessors and/or other types of electronic components. Moreover, one or more input and output units can also be provided, for example interfaces, input keys, displays, optical and/or acoustic indicators or similar devices. Furthermore, one or more of the units 144, 145, 146, and 147 can also be combined wholly or partly with other components of the analysis system 110. Thus, by way of example, the evaluation device 145 and/or the decryption device 147 can also wholly or partly be already integrated for example in the image sensor 130, for example in a CMOS and/or CCD chip of said image sensor 130.

In the exemplary embodiment illustrated in FIG. 2, the detector 124, as explained above, may be utilized in a multifunctional manner. For this purpose, a coding 118 is applied on the test tape 114. Alternatively or additionally, however, one or more codings 118 can also be arranged on the medical disposable item 117 in the form of the tape cassette 112, or at other locations, for example on a packaging of the tape cassette 112. Various configurations are conceivable.

Figure 3:
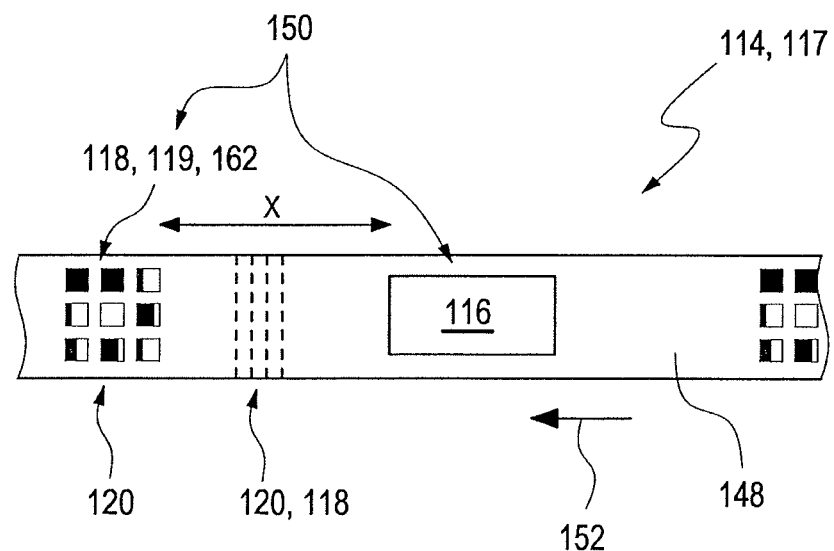
FIG. 3 shows a schematic construction of a test tape according to the invention for use in an analysis system in accordance with FIGS. 1 and 2.

An exemplary embodiment of a test tape 114 which can be used in the context of the analysis system 110 or the decoding device 111 according to the invention is illustrated in FIG. 3. In this case, only an excerpt from this test tape 114 is shown, said test tape comprising a linear series of analysis zones 116 with test chemicals for detecting the analyte and codings 118 in the form of corresponding optical information components 119 in an alternating fashion on a carrier 148, for example a transparent plastic tape. In this case, one coding 118 is respectively assigned to one analysis zone 116, such that the respective one analysis zone 116 and the assigned coding 118 with the optical information component 119 form a coding/analysis zone pair 150. However, other assignments are also possible, in principle, such that, by way of example, one coding 118 can be assigned to a plurality of analysis zones 116 or one analysis zone 116 can be assigned to a plurality of codings 118. In a spooling direction of the tape, said direction being designated symbolically by the reference numeral 152 in FIG. 3, the coding 118 can be disposed upstream of the analysis zone 116, for example, by a known distance X, for example, such that the coding 118 of a coding/analysis zone pair 150, in the spooling direction 152, first passes the measurement position 136, followed by the associated analysis zone 116. However, other configurations are also possible, in principle.

In the embodiment shown in FIG. 3, the coding 118 is generally in the form of a coding with optical information components 119 in the form of a plurality of individual two-dimensional fields, the arrangement of which is explained in greater detail by way of example below in FIG. 6. In principle, however, another arrangement of the coding, for example a one-dimensional coding, for example a coding in which the fields are arranged one behind another in the spooling direction 152, is also possible, in principle.

In the case of the analysis system 110 proposed, the detector 124 is used in a multifunctional manner. Thus, said detector is firstly used to measure the discoloration of the analysis zone 116. Furthermore, said detector 124 can optionally also identify the tape position, for example by the coding 118 itself, the positioning markers 120 or the analysis zones 116 being identified by means of the detector 124 and being utilized for positioning. Furthermore, in the context of the present invention and in the context of a decoding device 111 proposed, the detector 124 can also be used as a detection device 125 for detecting the optical information component 119 of the coding 118, particularly if all information components required for this purpose can be identified simultaneously or successively in a measurement window of said detector 124. In particular, it is conceivable in this way to apply all required item-specific information components in the form of the optical information component 119 of the optically perceptible coding 118 to the test tape 114, for example by printing, labeling or similar application methods. Consequently, item-specific information components can therefore be accommodated in the associated coding 118 individually for each analysis zone 116 or for each group of analysis zones 116 which can be detected simultaneously or successively in the measurement position 136 by the detector 124. In a first position of the test tape 114, the analysis zone 116 or the group of analysis zones 116 is or are in the measurement position 136, whereas in a second position of the test tape 114, the associated coding 118 is in said measurement position.

In the exemplary embodiment illustrated in FIG. 3, the coding 118 or the optical information component 119 of said coding 118 comprises a coding field 162 for the item-specific information components. This coding field 162 can, as described above, simultaneously also be used as a positioning marker. However, alternatively or additionally, as likewise illustrated in a dashed manner in FIG. 3, with a coding field 162 used as positioning marker 120 it is also possible to provide a separate positioning marker in the coding 118. This positioning marker 120 can, for example, likewise be arranged at a predefined distance from the analysis zone 116, such that the distance X between the coding 118 and the associated analysis zone 116 can, for example, also be defined from this separate positioning marker 120.

In both cases, that is to say in the case in which the coding 118 comprises a separate positioning marker 120 (such as in dashed-line from FIG. 3) or in the case in which the coding field 162 of the coding 118 containing the item-specific information component is also used for positioning, it is possible that one and the same detector 124 is also able to identify all elements 116, 118, 120 and is therefore available for determining glucose, identifying the position and evaluating the item-specific information component. In principle, however, other configurations are also possible in the context of the decoding device 111 proposed, for example a separate detection device 125.

Figure 4:
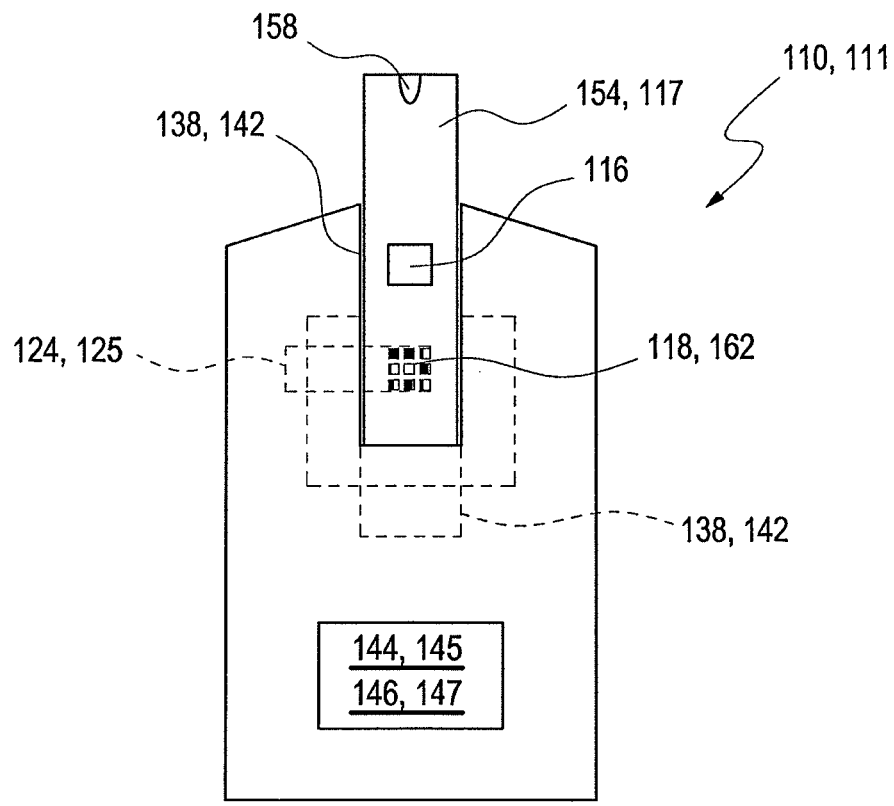
FIG. 4 shows an exemplary embodiment of an analysis system with a test strip.
Figure 5:
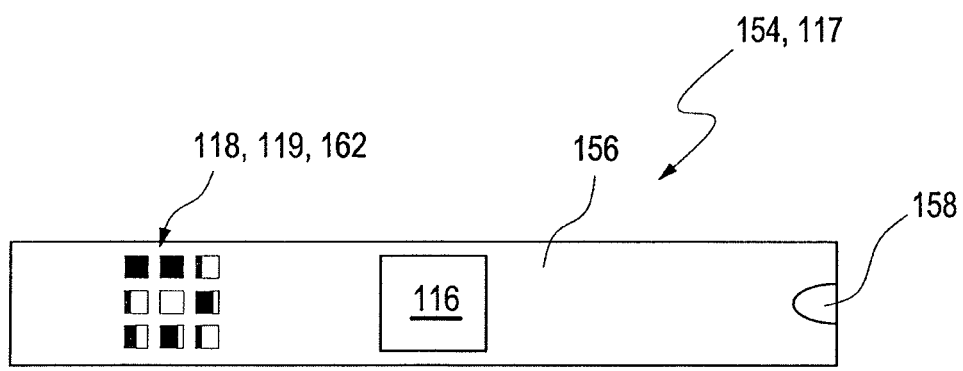
FIG. 5 shows an exemplary embodiment of a test strip for use in an analysis system in accordance with FIG. 4.

In FIGS. 1 to 3, the analysis system 110 or the decoding device 111 according to the invention was explained using the example of a medical disposable item 117 in the form of a test tape 114. FIGS. 4 and 5 illustrate an exemplary embodiment which is based on the use of test strips 154 as medical disposable item 117. These test strips 154, which are illustrated individually as an exemplary embodiment in FIG. 5, again comprise a carrier 156, for example a paper, polymeric, and/or ceramic carrier. At a front end, said carrier 156 has an application zone 158, in which a liquid sample, for example a drop of blood, can be applied to the test strip 154. This liquid sample is transported to an analysis zone 116 of the test strip 154 by means of capillary forces in order to bring about an analyte-specific reaction there, colorimetrically or electrochemically corresponding to the proportion of glucose in the liquid sample.

At an end lying opposite the application zone 158 in this exemplary embodiment, the test strip 154 furthermore again has a coding 118 with an optical information component 119 containing the item-specific information component in an encrypted form. In this exemplary embodiment, too, the coding 118 is again merely indicated, such that, alongside the two-dimensional optical information component illustrated, it can for example in turn also comprise a one-dimensional coding, for example in the form of individual fields arranged one behind another. For a possible exemplary embodiment of the coding 118, reference may in turn be made to the subsequent FIG. 6. This coding 118 is again optically readable. Furthermore, alongside the item-specific information component, the coding 118 can again also comprise one or more positioning markers 120, which is not illustrated in FIG. 5 but is optionally possible and can facilitate the positioning. However, alternatively or additionally, that part of the coding 118 which comprises the item-specific information component can simultaneously also be used as a positioning marker 120.

In an exemplary embodiment of the analysis system 110 as illustrated in FIG. 4, which simultaneously functions as a decoding device 111 or comprises such a decoding device 111, a guide 138 can again be provided as a constituent part of a transfer device 142 for the test strip 154. This guide 138 has the effect that the test strip 154 can be guided laterally past a detector 124, which is indicated schematically in FIG. 4. Said detector 124 can in turn simultaneously be used as a detection device 125 in the context of the decoding device 111 proposed. However, a separate detection device 125, which is separate from the detector 124 for detecting the analysis zone 116, can also be used, in principle. In a second position illustrated in FIG. 4, in this case, in the exemplary embodiment illustrated, the coding 118 is arranged wholly or partly in the field of view of the detector 124. If the test strip 154 is pushed further into the analysis system 110, for which purpose the guide 138 can be embodied in correspondingly elongated fashion, for example, then the analysis zone 116 of the test strip 154 enters the field of view of the detector 124, and the test strip 154 is in a first position. The described reaction of the analysis zone 116 can be evaluated in this first position. Otherwise, the functionality of the analysis system 110 in accordance with FIG. 4 can substantially correspond to the functionality of the analysis system 110 in accordance with FIGS. 1 and 2.

Figure 6:
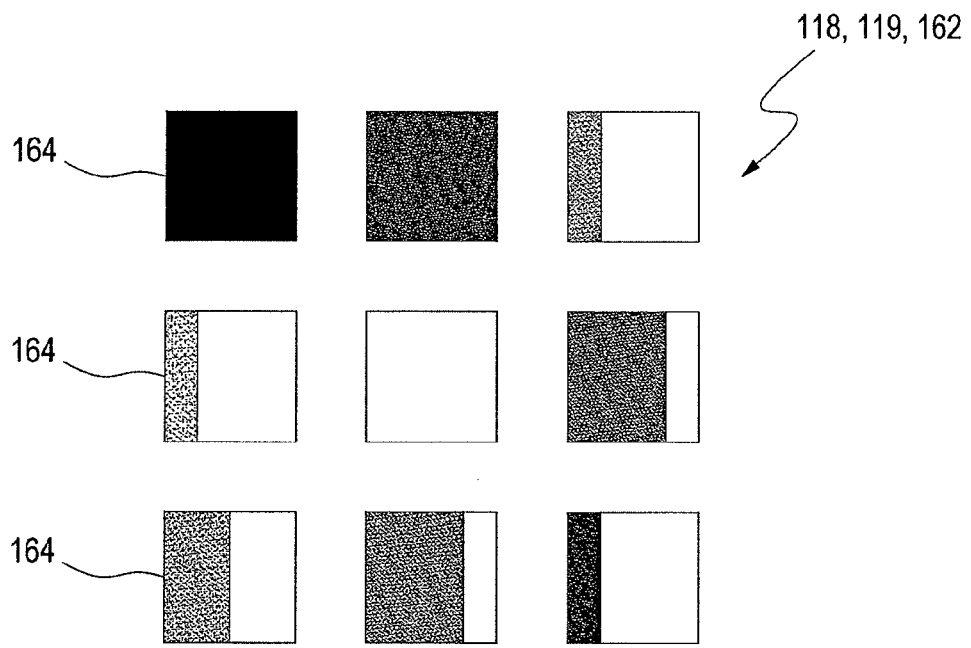
FIG. 6 shows an exemplary embodiment of a coding according to the present invention.

FIGS. 6 to 9 illustrate different exemplary embodiments of the coding 118 (or of the optical information component 119 containing the item-specific information component) and also examples of a method for evaluation by means of a histogram analysis. In this case, FIG. 6 shows an exemplary embodiment of the coding 118 in which the coding 118 comprises a two-dimensional coding field 162 comprising a plurality of individual fields 164. As described above, the coding 118 can additionally also comprise one or more positioning markers 120, or the coding field 162, which comprises the item-specific information component in an encoded form, can simultaneously also be used for positioning the test tape 114 and/or the test strip 154. The coding 118 illustrated in FIG. 6 can be used, in principle, on test tapes 114, on test strips 154 or on other types of medical disposable items 117.

The two-dimensional coding with the optical information component 118 in the coding field 162 advantageously utilizes the fact that the detector 124 used for evaluating the analysis zone 116 is in many cases equipped as a spatially resolving detector 124 with a spatially resolving image sensor 130, for example in the form of a compact sensor array. As described in EP 1 843 148 A1, for example, the evaluation of the analysis zone 116 can also be carried out by means of a gray-scale value analysis, in particular by means of a gray-scale value histogram. This histogram generation can, for example, be implemented directly in the detector 124, for example in a CMOS chip of the detector 124. In a similar manner, the gray levels of the optical information component 119 of the coding 118 can also be evaluated, for example likewise once again wholly or partly in the CMOS chip of the detector 124 and/or in some other type of evaluation device 145. The advantages of the complete or partial implementation of the evaluation device 145 in the image sensor 130, for example the CMOS chip of the detector 124, consist in a reduced complexity for peripheral hardware, i.e. in reduced clock times, the possible avoidance of image memories and a reduced energy requirement.

On the basis of the example of the coding in FIG. 6, an example of an encryption of item-specific information components in the coding 118 or the optical information component 119, and also an example of the decryption of said information components will be described below. The coding 118 comprises the optical information component 119 in the form of the above-described coding field 162, which can have an at least approximately square form in the illustrated embodiments. The coding field 162 comprises a plurality of fields 164 (nine fields 164 shown in FIG. 6), which per se can likewise again have a square or at least approximately square shape and which are arranged in a 3×3 matrix. The fields 164 can have a border or else be configured without an edge. Another arrangement of the fields 164 is also possible, in principle, for example a linear arrangement with nine fields 164 arranged one behind another.

As illustrated in FIG. 6, the fields 164 are filled with gray levels to different degrees of filling. This exemplary embodiment of a coding 118 with two-dimensional optical information components 119 with a gray-level coding thus affords the possibility of carrying out a histogram evaluation. This histogram evaluation, as explained above, can comprise a simple frequency distribution and need not necessarily comprise a graphical evaluation, as illustrated in FIG. 7.

For the purpose of the histogram evaluation, an image of the coding 118 or of the coding field 162 can be recorded if the test element in the form of the test tape 114 and/or test strip 154 is situated in the above-described second position, in which the coding 118 is arranged at least partly in the field of view of the detector 124 and hence in the measurement position 136. From the degree of filling of each individual field 164, each gray level can then be assigned a specific number of pixels with this gray-scale value. In the example, nine gray-scale values are illustrated, each of which can assume four degrees of filling, i.e. from wholly filled (as in the black field 164 in the top left corner of FIG. 6) through ¾ filled, ½ filled to ¼ filled. In order to clarify the degree of filling, the edges of the square fields 164 are also concomitantly marked in FIG. 6, but this need not necessarily be the case. Overall, the coding shown in FIG. 6 results in 36 combination possibilities (9 gray-scale values×4 degrees of filling). This merely represents one exemplary embodiment of a possible coding. Other numbers of possible gray levels and/or degrees of filling are also conceivable and may be selected on the basis of the sensitivity and/or quality of the components employed for performing the optical detection.

Figure 7:
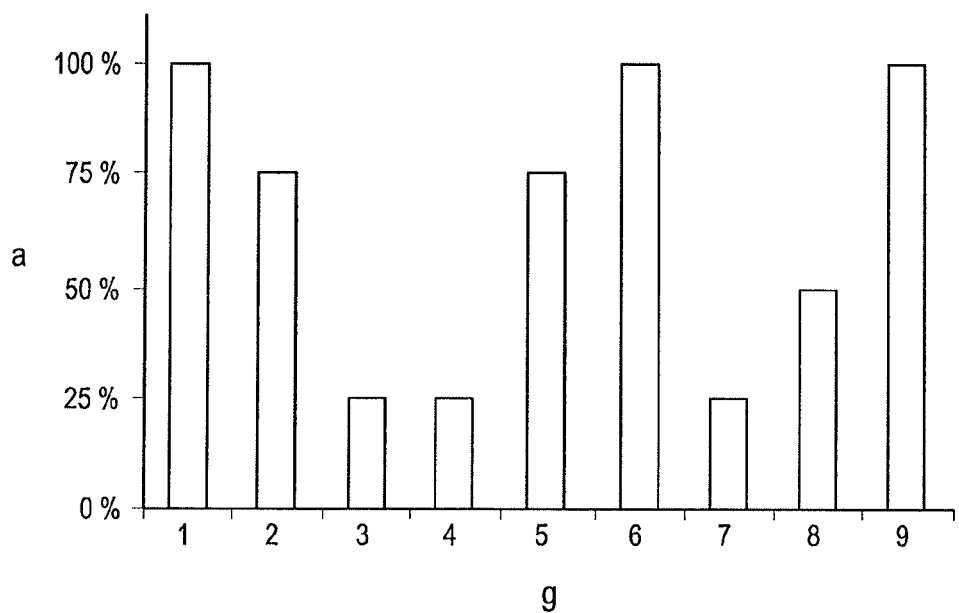
FIG. 7 shows an exemplary embodiment of a histogram analysis of the coding in accordance with FIG. 6.

By way of example, a gray-scale value histogram illustrated in FIG. 7 would result from the coding illustrated in FIG. 6. In this case, the degree of filling a in % is plotted against each gray level g, the gray levels here being numbered consecutively from 1 to 9. If the sequence of the gray levels g in the histogram in accordance with FIG. 7 is understood to be an order, i.e. for example a sequence of digits, then it is possible to generate 49, equal to 262144, numbers using this 9-field code with 4 degrees of filling, for which purpose, with a standardized bar code, for example, a depth of 18 bits would be necessary since 218 is equal to 49.

Figure 8:
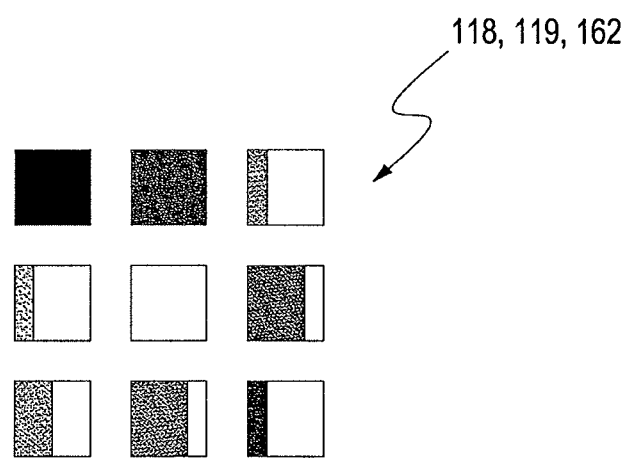
FIG. 8 shows an exemplary embodiment of a gray-level coding of the number 262144.
Figure 9:
FIG. 9 shows the number 262144 illustrated by a commercially available strip bar code.

As an example, FIGS. 8 and 9 compare the number "262144" using the gray-scale value coding according to the invention (FIG. 8) with a representation using a commercially available bar code (code 25, FIG. 9). The reduction of the space requirement for a coding at a given line resolution (here 300 dpi) as made possible as a result of the extension from 2 (black/white) to 9 gray levels is clear in this case, wherein the gray-scale value coding could even be significantly reduced in size. Conversely, with no change in the space requirement for the coding 118 or the optical information component 119 on the medical disposable item 117, the storage depth or the number of information components that can be encrypted in the coding 118, for example item-specific information components, could be significantly increased.

Especially in the case of a gray-scale value coding, it should be emphasized that the read-out by means of a histogram can be made at least substantially insensitive with respect to translation and/or rotation. This can be effected, as is described for example in EP 1 843 148 A1, by means of a direct, immediate gray-scale value/degree of filling evaluation, without the "detour" via a spatially resolved detection of image information components. This means that even a tilting of the test strip 154 or test tape 114 can enable the coding 118 to be read out in an entirely satisfactory manner. Likewise, the form of the coding is substantially flexible, such that horizontally and/or vertically oriented rectangles, circles, diagonal lines having different gray-scale values and thicknesses, or the like could also be used instead of square fields 164 and/or square coding fields 162.

The selection of the nine gray levels and four filling factors illustrated in FIG. 6 is likewise a simplified, exemplary illustration. Conceptually, the embodiment of the invention is based on the fact that, in the case of analysis systems 110 optimized for glucose determination, the number of gray-scale values that can be identified is designed precisely with the aim of determining gray-scale values as exactly as possible. This advantage especially, particularly if the same detector 124 is also utilized as a detection device 125 for reading out the optical information component 119, can also be utilized for reading out the coding 118. While for glucose determination the requirements made of the accuracy of the measurement are conceptually approximately 0.1% reflectance over a range of approximately 50% reflectance and, therefore, 500 gray levels should be identifiable, it thus appears to be realistic to be able to separately identify at least 50 gray levels for a gray-scale value coding. By way of example, if a detector 124 with an image sensor 130 having 106 pixels is used, then 20,000 pixels would be available for each gray level. Assuming a Poisson distribution, the number of pixels of a specific gray-scale value could then theoretically be determined to 0.7% accuracy. Consequently, the filling factors could be subdivided into 141 levels. Taking account of the technical implementability, in particular the edge effects and the width of the gray-scale value distributions, it appears to be possible to realize at least 30 levels. It can be shown overall that the edge effects for given area of a right-angled quadrilateral are minimal when the rectangle is a square, as a result of which square fields 164 and/or square coding fields 162 are useful. Consequently, it would be possible to encode 5,030 numbers in an image, which corresponds to a binary information depth of approximately 170 bits. Given an information requirement of 406 bits, for example, the information component could thus be represented in at most three images of the detector.

If the number pairs of gray-scale value and degree of filling are determined, as shown on the basis of the histogram analysis in FIG. 7, for example, then the roles of gray-scale value and degree of filling can also be interchanged during the encoding of numbers. Thus, by way of example, it is possible to effect ordering according to degrees of filling, instead of an order according to gray-scale values. The gray-scale value can then reproduce the value of this location in the code instead of the degree of filling. In this way, in the above example, it is even possible to represent 3,050 instead of 5,030 numbers, which corresponds to a bit depth of 245 bits in a binary system. It can easily be shown that this exchange of roles is advantageous whenever the base (originally 50 here) of the power is greater than the exponent (originally 30 here).

For generating the gray-scale values, it is not absolutely necessary to generate a homogenous area with constant gray-scale value, rather it is also possible to use differently structured coding fields 162, differently structured fields 164, or otherwise structured areas as long as the image of the structuring at the location of the detector is significantly smaller than 1 pixel. Hatching and dotting are examples of such structuring.

If appropriate, it may furthermore be helpful to use the extreme values black and white, as illustrated in FIG. 6 by way of example in the first field of the first row and, respectively, in the second field of the second row, not only for reading out the coding but at the same time for the scaling of the analysis system 110. In a histogram of the type illustrated in FIG. 7, after the coding has been read out, it is then possible, on the basis of this black-white information regarding the reference values "black" and "white", to effect a calibration as reference for determining the glucose concentration by means of the analysis zone 116. As a result of this calibration, the analysis system 110 can be made more robust with respect to fluctuations in the sensor sensitivity, with respect to a degradation of the illumination light intensity of the light source 134 (for example of the LEDs) or with respect to similar fluctuations.

The gray-level coding described with reference to FIGS. 6 and 7 can also be used just for a portion of the item-specific information components required. Thus, by way of example, the batch coding by means of the coding 118 can be used just for a portion of the required code, wherein the remaining portion of the coding can remain on a different coding medium ("split code"). Examples of such split codes are described in the application PCT/EP2008/004293. Thus, by way of example, an additional coding medium, for example in the form of a bar code on the tape cassette 112, in the form of a ROM key or similar additional coding media can be used.

Figure 10:
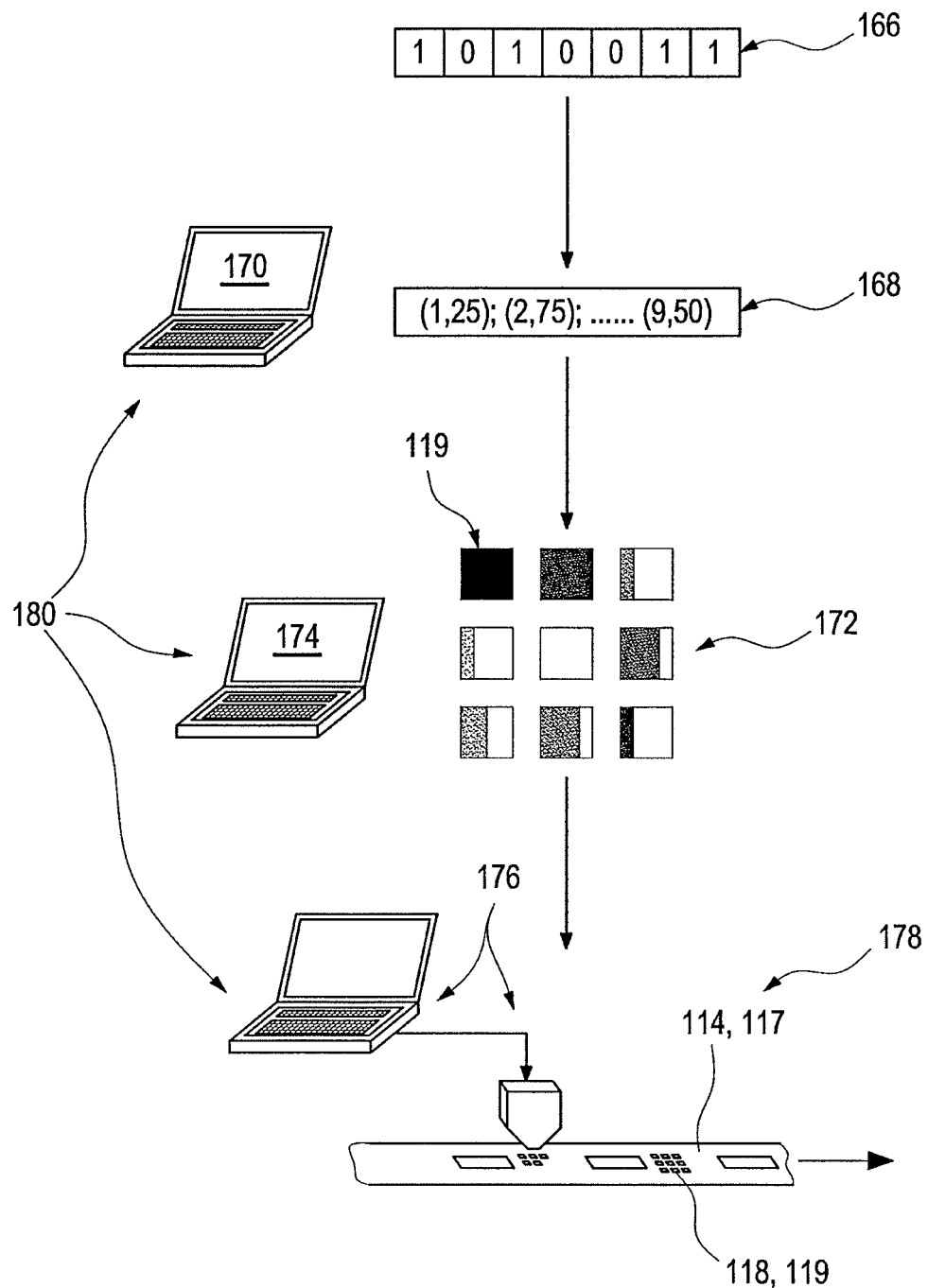
FIG. 10 shows a schematic flow diagram of an exemplary embodiment of an encoding method according to the present invention.
Figure 11:
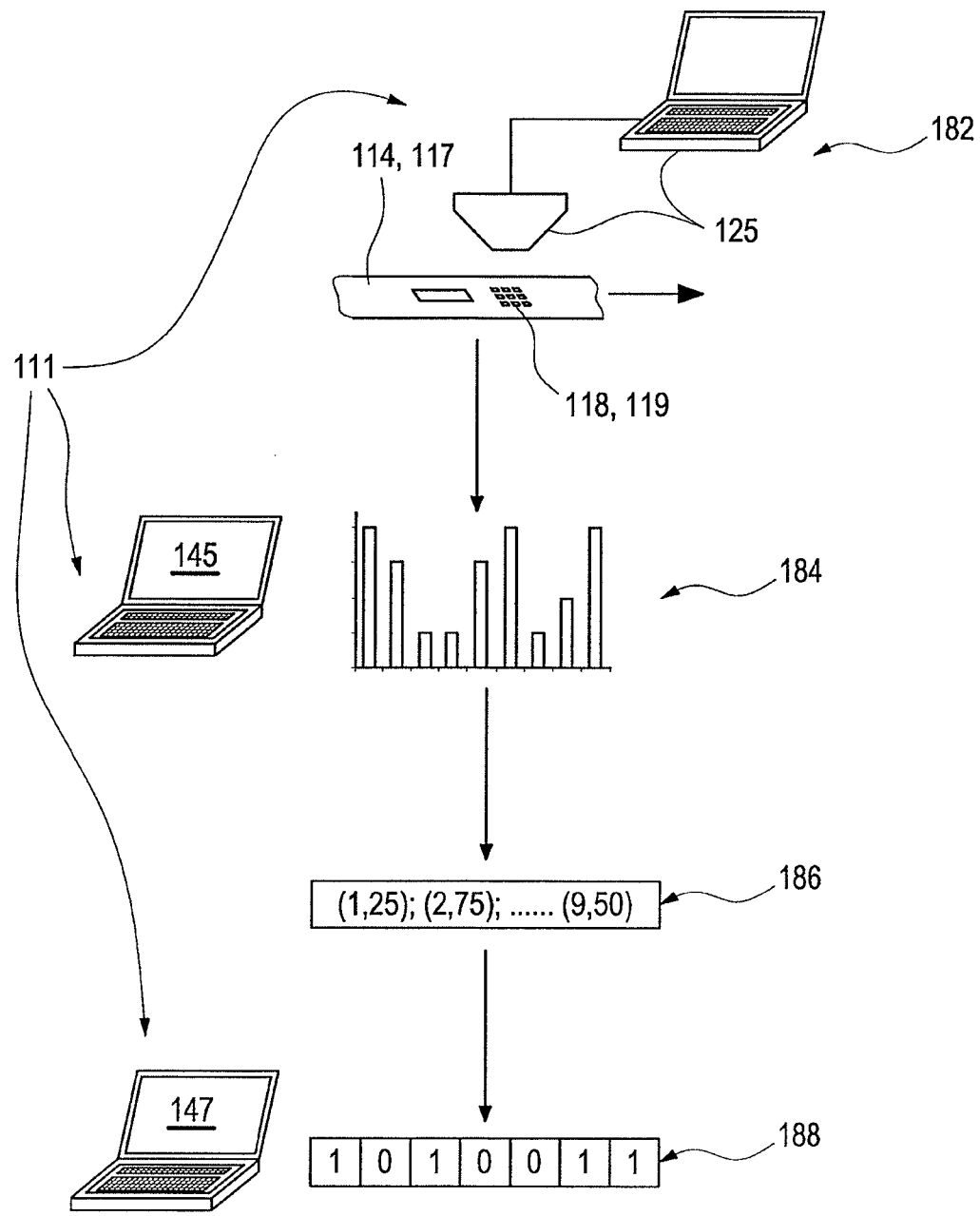
FIG. 11 shows a schematic flowchart of an exemplary embodiment of a decoding method according to the present invention.

Finally, FIGS. 10 and 11 illustrate, in a schematic illustration, a flowchart of a possible exemplary embodiment of an encoding method according to the invention (FIG. 10) and, respectively of a decoding method according to the invention (FIG. 11). In this case, the individual method steps are merely indicated schematically, wherein, for possible configurations of these method steps, reference may largely be made to the above description. Furthermore, additional method steps not presented in FIGS. 10 and 11 can also be encompassed. Moreover, the sequence illustrated is not absolutely mandatory, such that, by way of example, one or more method steps can be carried out in a different sequence than the sequence illustrated, can be carried out temporally in parallel or temporally in overlapping fashion or else can be carried out individually or in groups in repeated fashion.

In the case of the encoding method illustrated in FIG. 10, firstly at least one information component is provided in method step 166. Said information component can comprise an item-specific information component, for example, and can be provided, for example, manually, by means of a data carrier, a network, a production device for test elements, or the like. The item-specific information component is merely indicated symbolically in FIG. 10.

In method step 168, the information component is converted into a code comprising a plurality of pairs composed of a gray-scale value and a degree of filling. This conversion in step 168 can be effected, for example, on the basis of a predefined conversion specification such as is known to the person skilled in the art for example from the field of the conversion of customary information components into binary codes. In this case, by way of example, a gray-scale value can be inserted at the first location of the pairs, and a degree of filling at the second location, or vice versa, as explained above. The assignment specifications for generating the code in step 168 can be stored, for example, in a computer, in an electronic table or in some other type of code generating device 170, as indicated symbolically in FIG. 10.

In a next method step, step 172, the code in the form of the gray-scale value/degree of filling pairs which was generated in step 168 is then converted into a two-dimensional optical information component 119. This conversion can be effected by means of a corresponding conversion device 174, as likewise again indicated symbolically in FIG. 10.

The optical information component 119 generated in this way is subsequently applied to the medical disposable item 117, which is symbolized here by way of example in the form of a test tape 114, by means of an application device 166 in a method step 178. Said application device 176 can comprise, for example, a printing device, a labeling device or some other type of application device, and also, if appropriate, once again, as likewise indicated in FIG. 10, a data processing system.

In this case, the code generating device 170, the conversion device 174 and the application device 176 are illustrated symbolically as different devices in FIG. 10 and together form an encoding device 180. It should be pointed out that this encoding device 180 can also be configured differently than the embodiment shown in FIG. 10. Thus, by way of example, the devices 170, 174 and 176 can also be wholly or partly combined. By way of example, the conversion device 174, in which the optical information component 119 is generated, can also be arranged wholly or partly in the application device 176, such that, from the gray-scale value/degree of filling pairs generated in method step 168, the optical information component 119 can also first be generated directly during application in step 178, for example by means of a corresponding printer, which can directly process and convert the gray-scale value/degree of filling pairs as input information.

FIG. 11 illustrates a schematic flowchart of a decoding method according to the invention. The observations with regard to possible further method steps, other sequences, temporally parallel implementations and similar indications with regard to the schematic illustration which were mentioned above with regard to FIG. 10 analogously apply to FIG. 11 as well. The decoding method illustrated in FIG. 11 can be used, in particular, for decoding a coding produced by means of the method in accordance with FIG. 10.

In a first method step, step 182, the optical information component 119 of the code 118 is detected by means of a detection device 125. The detection device 125 is in turn merely illustrated symbolically in FIG. 11 and comprises, for example, a data processing device. As described above with reference to FIG. 2, said data processing device can be integrated, for example, wholly or partly in the image sensor 130 and/or in a separate evaluation unit 144.

Afterward, in steps 184 and 186, which can also be combined to form a common step, by means of a histogram analysis (step 184), the optical information component 119 is converted into a code composed of gray-scale value/degree of filling number pairs. This can again be effected, for example, wholly or partly in an evaluation device 145. The separation of steps 184 and 186 in FIG. 11 indicates an option which has been described above and according to which the actual histogram analysis in step 184 can be effected, for example, in the image sensor 130 as evaluation device 145, wherein the actual conversion into a code can be effected, for example, in the evaluation unit 144 of an analysis system 110 as evaluation device 145. The conversion into the code composed of gray-scale value/degree of filling number pairs in steps 184 and 186 constitutes, in principle a reversal of the encoding in steps 168 and 172 as described in FIG. 10, such that reference may at least largely be made to the above description.

Afterward, in method step 188, the original information is recovered from the code generated in step 186. In principle, this constitutes a reversal of step 166 or 168 in FIG. 10, such that in this regard reference may again largely be made to the above description. By way of example, for this purpose, a decryption device 147 can in turn be used, which, by way of example, can be wholly or partly identical to the evaluation unit 144 of an analysis system 110 in respect of components. Consequently, the components 125, 145 and 147 together form a decoding device 111, which, by way of example, can be used in an analysis system 110 or which itself can be configured as an analysis system 110. In this way, by way of example, item-specific information components of medical disposable items 117 in the form of test tapes 114 and/or test strips 154 can be read out and used in the analysis of liquid samples. It should again be pointed out that a different configuration of the decoding device 111 is also possible, for example a different type of combination of the components 125, 145 and 147.

The features disclosed in the above description, the claims and the drawings may be important both individually and in any combination with one another for implementing the invention in its various embodiments.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present invention in detail and by reference to specific embodiments thereof, it will be apparent that modification and variations are possible without departing from the scope of the present invention defined in the appended claims. More specifically, although some aspects of the present invention are identified herein as preferred or particularly advantageous, it is contemplated that the present invention is not necessarily limited to these preferred aspects of the present invention.

What is claimed is:

1. A method for generating at least one coding on an item, wherein the coding comprises at least one information component in encoded form, wherein the method comprises the following steps:
    a) converting the at least one information component into a code, wherein the code comprises a plurality of value pairs each pair comprising a gray-scale value and a degree of filling;
    b) converting the code into an optical information component, wherein the optical information component comprises at least one field filled with at least one gray-scale value up to an associated degree of filling in accordance with the code; and
    c) applying the optical information component to the item.

2. The method of claim 1, wherein the optical information component comprises a plurality of fields, wherein each field is assigned to a specific gray-scale value and is filled with the latter up to the associated degree of filling.

3. The method of claim 1, wherein method steps a) and b) are performed by executing a computer program in a computer, the computer program being adapted to convert an inputted information component into a code and to convert said code into an optical information component.

4. The method of claim 1, wherein converting the code into the optical information component includes converting the code into a two-dimensional optical information component.

5. The method of claim 1, wherein the optical information component comprises a plurality of fields and each field is filled with at least one gray-scale value up to the associated degree of filling in accordance with the code.

6. A device for generating at least one coding on an item, wherein the coding comprises at least one information component in encoded form, wherein the device comprises:
    A) at least one code generating device, wherein the code generating device is adapted to convert the at least one information component into a code, wherein the code comprises a plurality of value pairs each pair comprising a gray-scale value and a degree of filling;
    B) at least one conversion device operatively connected to the at least one code generating device, wherein the conversion device is adapted to obtain or receive the code from the code generating device and to convert the code into an optical information component, wherein the optical information component comprises at least one field filled with at least one gray-scale value up to an associated degree of filling in accordance with the code; and
    C) at least one application device operatively connected to the at least one conversion device, wherein the application device is adapted to apply the optical information component to the item.

7. The device of claim 6, wherein the conversion device is adapted to convert the code into a two-dimensional optical information component.

8. The device of claim 6, wherein the optical information component comprises a plurality of fields and each field is filled with at least one gray-scale value up to the associated degree of filling in accordance with the code.

9. A method for decoding at least one encoded information component on an item, wherein the method comprises the following steps:
    i) detecting at least one optical information component applied on the item, wherein the optical information component comprises at least one field filled with at least one gray-scale value up to an associated degree of filling;
    ii) converting the optical information component into a code by means of a histogram analysis, wherein the code comprises a plurality of value pairs each pair comprising a gray-scale value and a degree of filling based on the histogram analysis; and
    iii) converting the code into the information component.

10. The method of claim 9, wherein method steps ii) and iii) are performed by executing a computer program in a computer, the computer program being adapted to convert an optical information component into a code and to convert said code into an information component.

11. The method of claim 9, wherein the optical information component is a two-dimensional optical information component applied on the item.

12. The method of claim 9, wherein the optical information component comprises a plurality of fields and each field is filled with at least one gray-scale value up to the associated degree of filling.

13. A device for decoding at least one encoded information component on an item, wherein the device comprises:
    I) at least one detection device for detecting at least one optical information component applied on the item, wherein the optical information component comprises at least one field filled with at least one gray-scale value up to an associated degree of filling;
    II) at least one evaluation device operatively connected to the at least one detection device and adapted to convert the optical information component into a code by means of a histogram analysis, wherein the code comprises a plurality of value pairs each pair comprising a gray-scale value and a degree of filling in accordance with the histogram analysis; and
    III) at least one decryption device operatively connected to the evaluation device and configured for converting the code into the information component.

14. The device of claim 13, wherein the device comprises at least one analysis system for detecting at least one analyte in a body fluid.

15. The device of claim 14, wherein the item comprises at least one optical test field for optically detecting the analyte and the analysis system comprises at least one optical detector for evaluating the optical test field, wherein the analysis system is configured to use the optical detector as part of the detection device for detecting the optical information component applied on the item.

16. The device of claim 13, further comprising a plurality of optical information components applied to the item.

17. The device of claim 13, wherein the detection device has at least one image sensor for detecting two-dimensional image information components, the image sensor comprising one or both of a CCD chip and a CMOS chip.

18. The device of claim 17, wherein the evaluation device is at least partly integrated in the image sensor.

19. The device of claim 13, wherein the optical information component is a two-dimensional optical information component.

20. The device of claim 13, wherein the optical information component includes a plurality of fields, and each field is filled with at least one grey-scale value up to the associated degree of filling.

21. A medical disposable item comprising at least one coding, wherein the coding comprises an optical information component having a plurality of fields, each field filled with a gray-scale value up to a degree of filling wherein the gray-scale value and degree of filling for each field comprise a value pair determined in order to associate the two-dimensional optical information component with a code.

22. The medical disposable item of claim 21, wherein the medical disposable item comprises at least one of the following disposable items:
    a test element for detecting at least one analyte in a body fluid sample; and
    a lancet for producing a sample of a body fluid.

23. The medical disposable item of claim 21, wherein the coding comprises at least one item-specific information component concerning the medical disposable item.

24. The medical disposable item of claim 23, wherein the medical disposable item comprises a test strip or a test tape having at least one test field for analyzing at least one body fluid, wherein the test field is applied on a carrier, wherein the coding is likewise applied to the carrier.

25. The medical disposable item of claim 21, wherein the coding comprises a two-dimensional optical information component.

* * * * *